(12) United States Patent
Lee

(10) Patent No.: US 7,574,205 B2
(45) Date of Patent: Aug. 11, 2009

(54) METHOD FOR MANAGING RESOURCES IN MOBILE TERMINAL

(75) Inventor: Chul-Min Lee, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 516 days.

(21) Appl. No.: 11/272,721

(22) Filed: Nov. 15, 2005

(65) Prior Publication Data

US 2006/0135198 A1 Jun. 22, 2006

(30) Foreign Application Priority Data

Nov. 15, 2004 (KR) .............. 10-2004-0093249

(51) Int. Cl.
*H04M 3/00* (2006.01)

(52) U.S. Cl. .............. 455/418; 455/566; 455/575.1; 455/450; 709/219; 700/83

(58) Field of Classification Search .............. 455/566, 455/575.1, 575.3, 450; 379/433.04; 700/83; 709/219; 714/E11.025, E11.003, E11.006
See application file for complete search history.

(56) References Cited

U.S. PATENT DOCUMENTS 4,570,217 A * 2/1986 Allen et al. .............. 700/83
5,925,101 A * 7/1999 Bayless et al. .............. 709/219
6,456,848 B1 * 9/2002 Freeman et al. .............. 455/450
6,941,160 B2 * 9/2005 Otsuka et al. .............. 455/566
2003/0083106 A1 * 5/2003 Seo .............. 455/566
2004/0077386 A1 * 4/2004 Nagasawa .............. 455/575.1
2005/0164745 A1 * 7/2005 Oe et al. .............. 455/566

FOREIGN PATENT DOCUMENTS

| EP | 1 463 278 A2 | 9/2004 |
|----|--------------|--------|
| JP | 2002-333987 A | 11/2002 |
| JP | 2002-344577 A | 11/2002 |
| JP | 2004-078936 A | 3/2004 |
| RU | 2 159 012 | 11/2000 |

* cited by examiner

*Primary Examiner*—Rafael Pérez-Gutiérrez
*Assistant Examiner*—Joseph Arevalo
(74) *Attorney, Agent, or Firm*—Birch, Stewart, Kolasch & Birch, LLP

(57) ABSTRACT

A method for managing resources in a mobile terminal includes determining whether or not a required resource is available to perform a requested task on the mobile terminal and selectively performing the requested task based on whether or not the required resource is available.

8 Claims, 6 Drawing Sheets

| | Resource name | Whether or not used | Process ID |
|---|---|---|---|
| 210 | Audio | Yes/No | MP3 |
| 220 | Video | Yes/No | – |
| 230 | Image | Yes/No | Photo |
| 240 | First display | Yes/No | Photo |
| 250 | Second display | Yes/No | SMS |

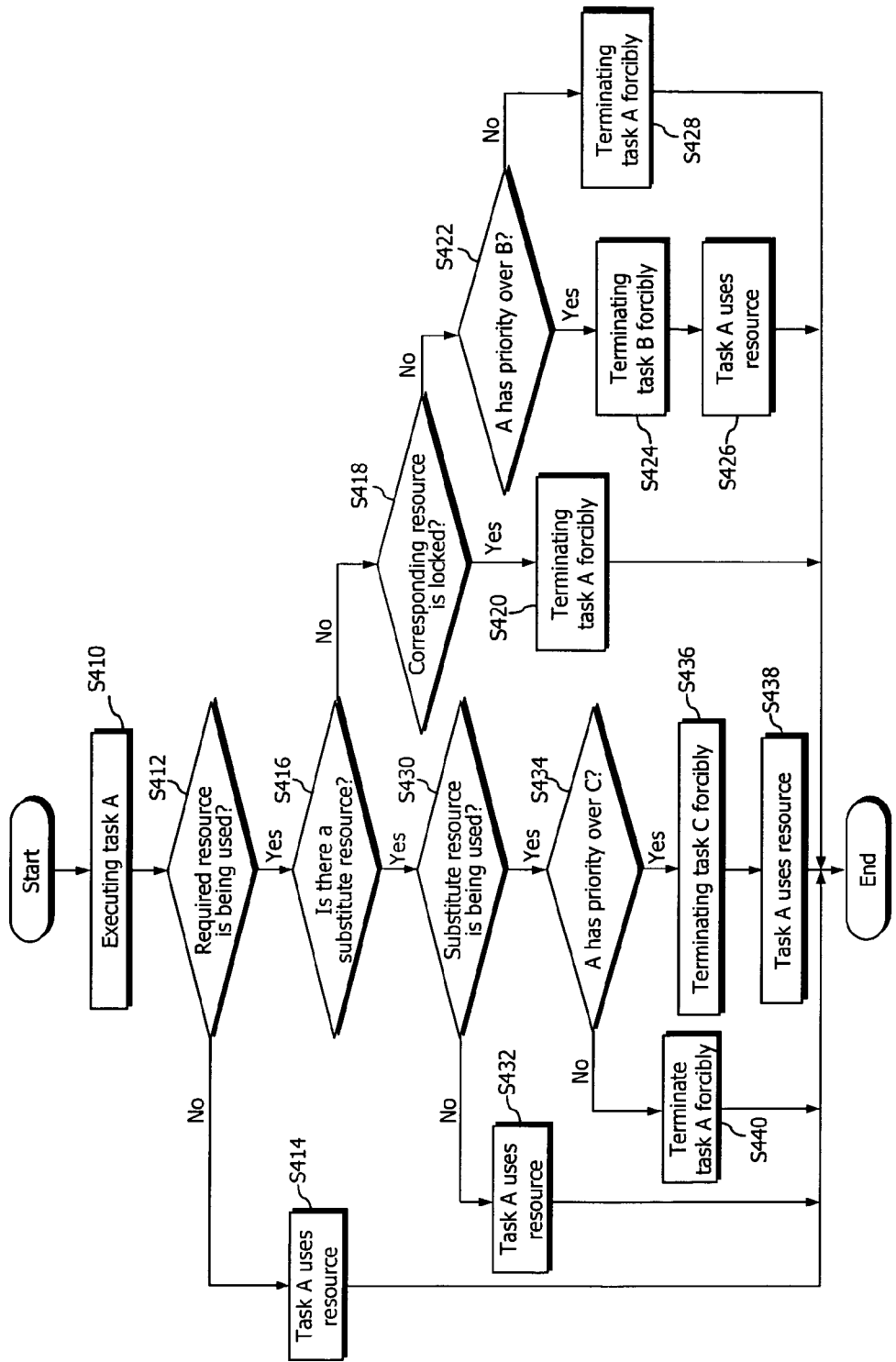

METHOD FOR MANAGING RESOURCES IN MOBILE TERMINAL

This application claims priority to Korean Patent Application No. 10-2004-0093249 filed in Korea on Nov. 15, 2004, the entire contents of which is incorporated by reference in its entirety.

BACKGROUND OF THE INVENTION

1. Field of the Invention

The present invention relates to a mobile terminal, and more particularly, to a method for managing resources in a mobile terminal having at least one display unit.

2. Description of the Related Art

Mobile terminals function muck like a mobile entertainment system. For example, mobile terminal users can watch a video, listen to music, surf the Internet or play games on their mobile terminal. Thus, users are spending more and more time on their mobile terminal.

However, because related art mobile terminals generally include a single display unit and provide one function at a time, it is difficult for the user to perform multiple tasks at the same time. For example, when the user is watching a movie, playing a game or performing some other multimedia streaming service on the terminal, and he or she simultaneously receives a phone call or text message, the user has to stop watching the movie, playing the game, etc. and answer or reply to the phone call or text message. Thus, the related art mobile terminal restricts the amount of multitasking that can be performed by the user.

SUMMARY OF THE INVENTION

Accordingly, an object of the present invention is to address the above-noted and other problems.

Another object of the present invention is to provide a method for managing resources in a mobile terminal that allows a user to perform multiple tasks simultaneously.

Yet another object of the present invention is to prevent the user from having to interrupt one task to perform another task on the mobile terminal.

To achieve these and other advantages and in accordance with the purpose of the present invention, as embodied and broadly described herein, there is provided a method for managing resources in a mobile terminal. The method according to an aspect of the present invention includes determining whether or not a required resource is available to perform a requested task on the mobile terminal and selectively performing the requested task based on whether or not the required resource is available.

According to another aspect of the present invention, there is provided a mobile terminal including a display having at least first and second display portions and a controller configured to determine whether or not a required resource is available to perform a requested task on at least one of the first and second display portions and to selectively perform the requested task based on whether or not the required resource is available.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 4 is a flowchart showing a method for managing resources in the mobile terminal in accordance with another embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
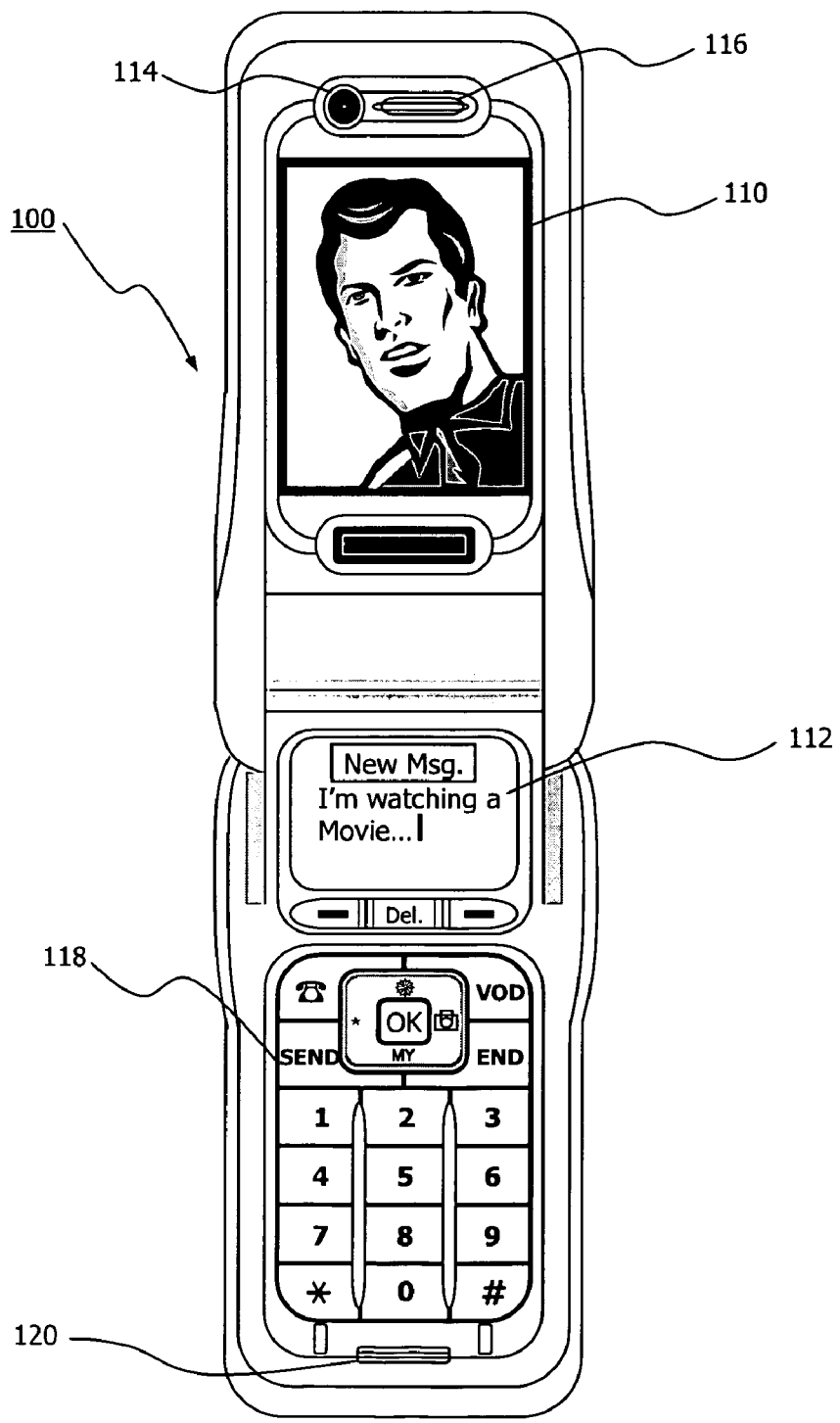
FIG. 1 is an overview showing a mobile terminal having two display units in accordance with an embodiment of the present invention.

Turning first to FIG. 1, which is an overview showing a mobile terminal 100 having two display units. As shown in FIG. 1, the mobile terminal 100 includes a first display unit 110 for displaying a list (or icons) of all tasks (or modules) available in the mobile terminal and an execution screen of the corresponding task, and also for outputting a main screen. Also included is a second display unit 112 for displaying a list of specific tasks and an execution screen of the corresponding task, and also for outputting an additional screen. The terminal 100 further includes a camera 114 for taking pictures or a video, a speaker 116 for outputting various audio signals such as voice, music and sound effects, a key pad 118 for inputting phone numbers and control commands, and a microphone 120.

In addition, the first display unit 110 outputs a main standby screen, a list of all tasks available in the mobile terminal 100 and an execution screen of a corresponding task. Also, the second display unit 112 displays a sub-standby screen when the first display unit 100 is occupied by a program or when the folder portion of the mobile terminal is closed (e.g., when the folder portion of the terminal is closed to thereby turn off the first display unit 110). The second display unit 112 also displays a list of specific tasks such as a short message service, an alarm, an incoming phone call and an execution screen corresponding to the specific task.

For example, when a video is reproduced using the mobile terminal 100, the first display unit 110 displays the video, and the second display unit 112 displays information about the video such as a caption of the displayed video or displays a screen for controlling the displayed video. In addition, when the user simultaneously receives a short message while the video is being displayed on the first display unit 110, the second display unit 112 displays an indication that the short message has been received.

As described above, the present invention advantageously manages and allocates resources for each appropriate display unit 110, 112, thereby allowing the user to perform multiple operations at the same time. Further, in the present invention, the resource management is preferably performed using a program that controls a multitasking performing function (hereinafter the program is referred to as the "controller").

Figures 2A, 2B:
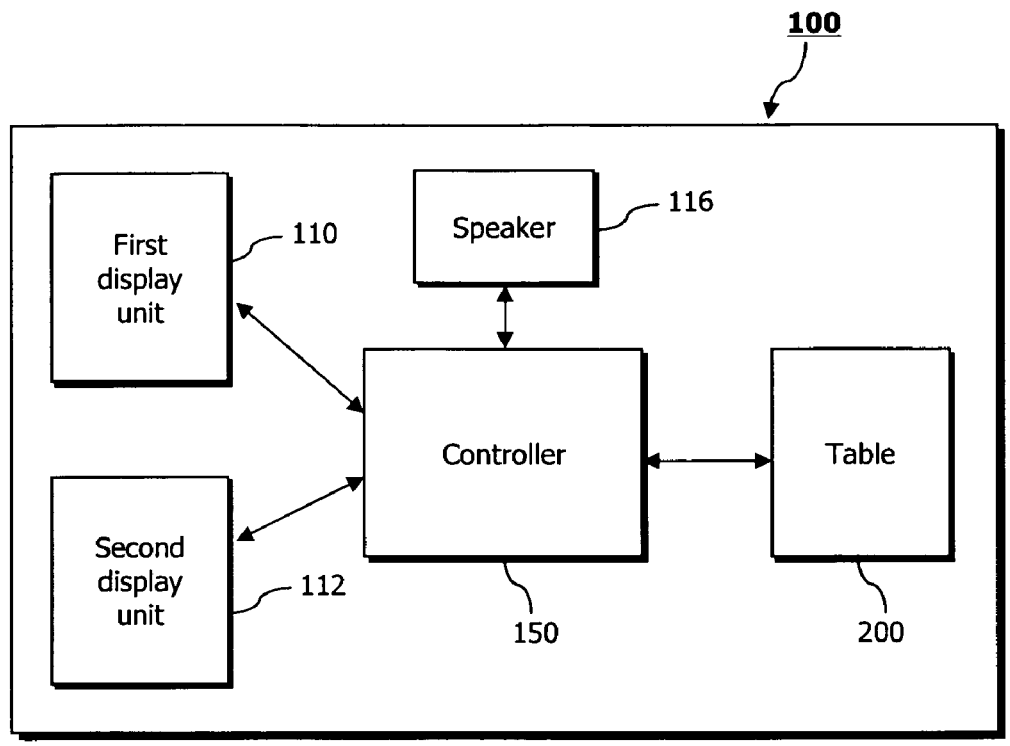
FIG. 2A is a block diagram showing an internal construction of the mobile terminal.
FIG. 2B is a table containing information on resources for multitasking in accordance with an embodiment of the present invention.

In addition, the controller preferably accesses a table including information about resources in the mobile terminal. For example, FIG. 2A illustrates a controller 150 and a corresponding table 200. FIG. 2B illustrates one example of the table 200 accessed by the controller 150 to manage, allocate and renew resources on the mobile terminal 100. FIG. 2A also illustrates the first and second display units 110, 112 and the speaker 116.

As shown in FIG. 2B, the table 200 stores a list of resources such as an audio resource 210, a video resource 220, an image resource 230, a first display resource 240 and a second display resource 250. The table 200 also stores information about whether or not each resource is being used and information about process IDs using each resource.

Figure 3A:
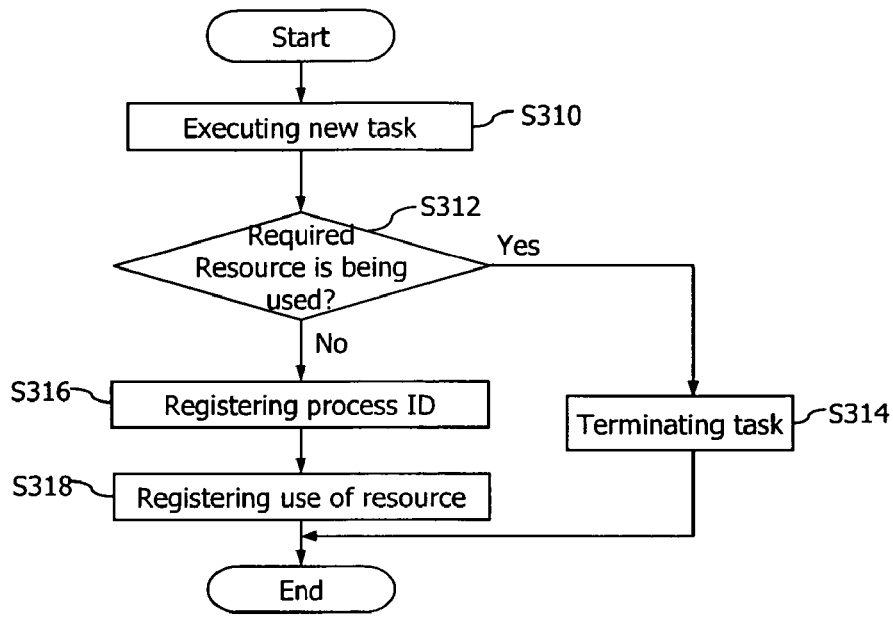
FIGS. 3A-3C are flowcharts showing a method for managing resources in the mobile terminal in accordance with various embodiment of the present invention.
Figure 3B:
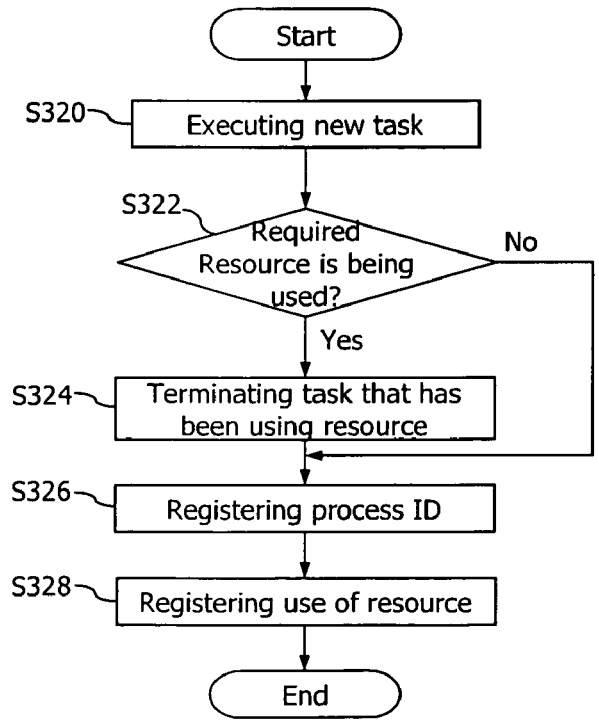
Figure 3C:
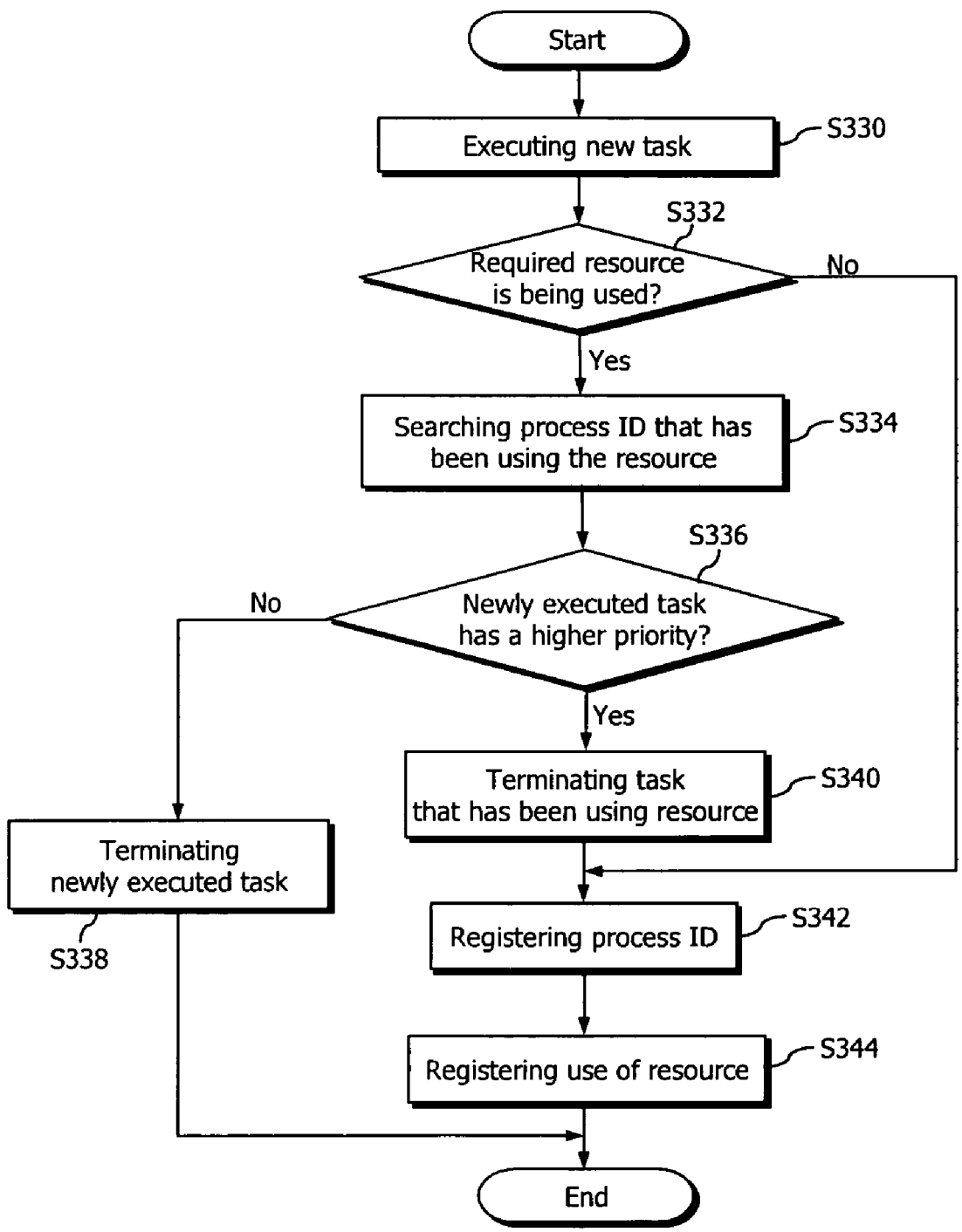

Turning next to FIGS. 3A-3C, which are flowcharts illustrating various embodiments of the present invention. As shown in these FIGS., and which will be described in greater detail below, when a new task starts, the controller 150 manages and allocates resources based on information contained within the table 200. The controller 150 may also use information regarding priorities of tasks (discussed in more detail with reference to FIG. 3C).

Referring first to FIG. 3A, which illustrates a newly executed task being terminated if a corresponding resource is being used by another task. As shown in FIG. 3A, if a new task is executed and requires a resource (S310), the controller 150 accesses the table 200 to determine whether or not a corresponding resource is already being used (S312). If the corresponding resource is being used (Yes in S312), the new task requiring the resource is terminated (S314). If the corresponding resource is not being used (No in S312), the controller 150 enters a new process ID corresponding the newly executed task in the table 200 (S316), assigns the corresponding resource to the newly executed table, and updates the table to indicate the newly executed task is using the corresponding resource (S318). Further, when a task is completed or is not being used, the controller 150 appropriately updates the table 200 to reflect the status of the task.

Turning next to FIG. 3B, which illustrates forcibly terminating an existing task already being used and starting the newly requested task. As shown in FIG. 3B, if a new task is executed and requires a resource (S320), the controller 150 determines whether or not a corresponding resource is being used based on information in the table 200 (S322). If the controller 150 determines the corresponding resource is being used (Yes in S322), the controller 150 searches the table 200 for the process ID of the resource currently being used and then terminates the corresponding task (S324). The controller 150 also updates the table 200 to include a process ID for the newly executed task in the table 200 (S326) and to indicate the newly executed task is using the corresponding resource (S328).

Next, FIG. 3C illustrates a priority being given to each task and the controller 150 executing or terminating a task based on the priorities. In more detail and as shown in FIG. 3C, if a new task is executed and requires a resource (S330), the controller 150 accesses the table 200 to determine if a corresponding resource for the new task is already being used (S332). If the controller 150 determines the corresponding resource is already being used (Yes in S332), the controller 150 searches the table 200 for a process ID of the resource already being used (S334).

The controller 150 then compares priorities of the newly executed task and the already executing task to determine which task has a higher priority (S336). If the controller 150 determines the newly executed task has a higher priority (Yes in S336), the controller 150 terminates the already executing task (S340). Further, the controller 150 then updates the table 200 to include the process ID of the newly executed task and that the corresponding resource is being used (S342 and S344). However, if the controller 150 determines the newly executed task does not have a higher priority (No in S336), the controller terminates the newly executed task (S340). The controller 150 also appropriately updates the table to reflect the cancellation of the newly executed task.

Further, the information about the priorities of the tasks may be stored in the table 200 or stored in another location of a memory in the mobile terminal. One example of assigning a priority to a task is to assign a relatively high priority for a Video On Demand (VOD) task. That is, the VOD task has a relatively high priority because the user is generally charged an extra free for viewing the requested video. Thus, it is preferable this VOD task not be interrupted for a task assigned a lower priority. Tasks such as a VOD task that are not to be interrupted are hereinafter referred to as "screen occupation tasks."

Thus, according to the present invention in one embodiment, if a new task is executed, the controller 150 checks the table 200 to determine if the related process for the new task is available. If the related process is available, the controller 150 appropriately updates the table 200, and if the resource for the newly executed task is already being used or is not available, the controller 150 terminates the new task. For example, and with reference to FIGS. 1, 2A-2B and 3A, if a task requiring the first display unit 110 is started, the controller 150 checks the table 200 to determine if the first display unit 110 is available. If the first display unit 110 is available, the new task is executed on the first display unit 110.

Further, because the controller 150 updates the table 200 to indicate the new task is executing on the first display unit 110, another task is prevented from using the first display unit 110. In addition, after the task occupies the first display unit 110, the controller 150 checks whether or not the second display unit 112 is available. If the second display unit 112 is available, the controller 150 displays additional information on the task being currently executed on the first display unit 110 or can display other information such as a received text message, etc, on the second display unit 112.

Further, if the user wants to execute a main task that only uses the first display unit 110 such as taking pictures with the camera 114, when the first display unit 110 is already displaying a screen occupation task that should not be canceled, the controller 150 would determine the first display unit 110 is not available. Thus, because the first display unit 110 is used by a "screen occupation task" and is essentially locked, the controller 150 sends an "unavailable" response to the main task indicating the first display 110 cannot be used. The requested main task is then terminated.

Meanwhile, if the user executes a task, which can be processed in the second display unit 112 such as writing a short message, while the first display unit is being used by the screen occupation task, the controller 150 accesses the table 200 to determine if the second display unit 112 is available. If the second display unit 112 is currently being used, the controller 150 cancels the task requesting the second display unit 112. However, if the controller 150 determines the second display unit 112 is available, the controller 150 executes the requested task on the second display unit 112. Thus, for example, the user can watch a video in the first display unit 110 and write/receive text messages on the second display unit 112.

In addition, if another additional task requiring the second display unit 112 such as an alarm is executed, the controller 150 determines the priorities of the additional task and the task already running in the second display unit 112, and cancels the task having the lower priority. For example, assuming the alarm is a low battery warning having a higher priority than a text message, the controller 150 would display the low battery warning in the second display unit 112 and cancel or put on hold the other task being performed in the second display unit 112.

Turning next to FIG. 4, which is a flowchart showing another embodiment of a method for managing resources in the mobile terminal according to the present invention. With reference to FIG. 4, if a new task A is executed in the mobile terminal (S410), the controller 150 accesses the table 200 to determine whether or not a resource which the newly executed task A requires is being used (S412). If the controller 150 determines the resource is not being used (No in S412), the controller assigns the corresponding resource the newly executed task A (S414) and appropriately updates the table 200.

However, if the controller 150 determines the resource is already being used by another task B (Yes in S412), the controller 150 determines whether or not there is a resource which can be substituted (hereinafter called a "substitute resource") (S416). If there is no substitute resource (No in S416), the controller 150 determines whether or not the resource being used by the other task B is locked (S418). When the controller 150 determines the resource is locked by the other task B (Yes in S418), the controller 150 terminates the newly executed task A (S420).

However, when the corresponding resource is not locked (No in S418), the controller 150 determines whether the newly executed task A has priority over the task B (S422). If the newly executed task A has priority over the task B (Yes in S422), the controller 150 terminates the task B (S424) and assigns the resource to the newly executed task A (S426). On the contrary, if the task B has priority over the newly executed task A (No in S422), the controller 150 forcibly terminates the newly executed task A (S428).

Meanwhile, according to the result of the determination in step (S416), if the controller 150 determines there is a substitute resource available (Yes in S416), the controller 150 then determines whether or not the substitute resource is being used by another task (S430). If the substitute resource is not being used by another task C (No in S430), the controller 150 assigns the substitute resource to the newly executed task A (S432). However, if the controller determines the substitute resource is being used by another task C (Yes in S430), the controller 150 determines whether the newly executed task A has priority over the task C (S434). If the newly executed task A has priority over the task C (Yes in S434), the controller 150 terminates the task C (S436) and assigns the resource to the newly executed task A (S438). If the task A does not have priority over the task C (No in S434), the controller 150 terminates the newly executed task A (S440) and the task C continually uses the substitute resource.

For example, when the audio resource 210 (see FIG. 2B) is being used to play music on demand (MOD) requested by the user, the controller 150 can use a substitute resource to inform the user there is an incoming phone call. In this example, rather than informing the user about the call with a ring sound using the audio resource 210, the controller 150 can advantageously vibrate the phone, display information on one of the displays 110, 112 etc, to inform the user about the incoming call.

In addition, if two users are communication with each other using a video communication feature included with their mobile terminals 100, the first display unit 110 displays an image of the other party, and the second display unit 112 displays an image of the user holding the respective terminal 100, which is photographed by the camera 114. In other words, the table 200 includes information that the first display resource 240, the second display resource 250, the video resource 220 and the audio resource 210 are being used. At this time, if an alarm function for informing the user of an appointment time, for example, is processed, the controller 150 designates the second display resource 250 as the substitute resource, because the first display resource 240 is being used by video communication and thus is locked (i.e. the first display resource is a designated screen occupation task).

In addition, because the alarm has priority over displaying the user's images on the second display resource 250, the controller 150 terminates the operation of displaying the user's image on the second display unit 112, and rather displays the alarm or appointment time information on the second display 112. In addition, to attract the user's attention, the phone may be vibrated or the display portion 112 may be highlighted etc. Further, the controller 150 may also reduce the size of the user's image being displayed on the second display unit 112 and display the reduced image somewhere on the first display unit 110.

Figure 5:
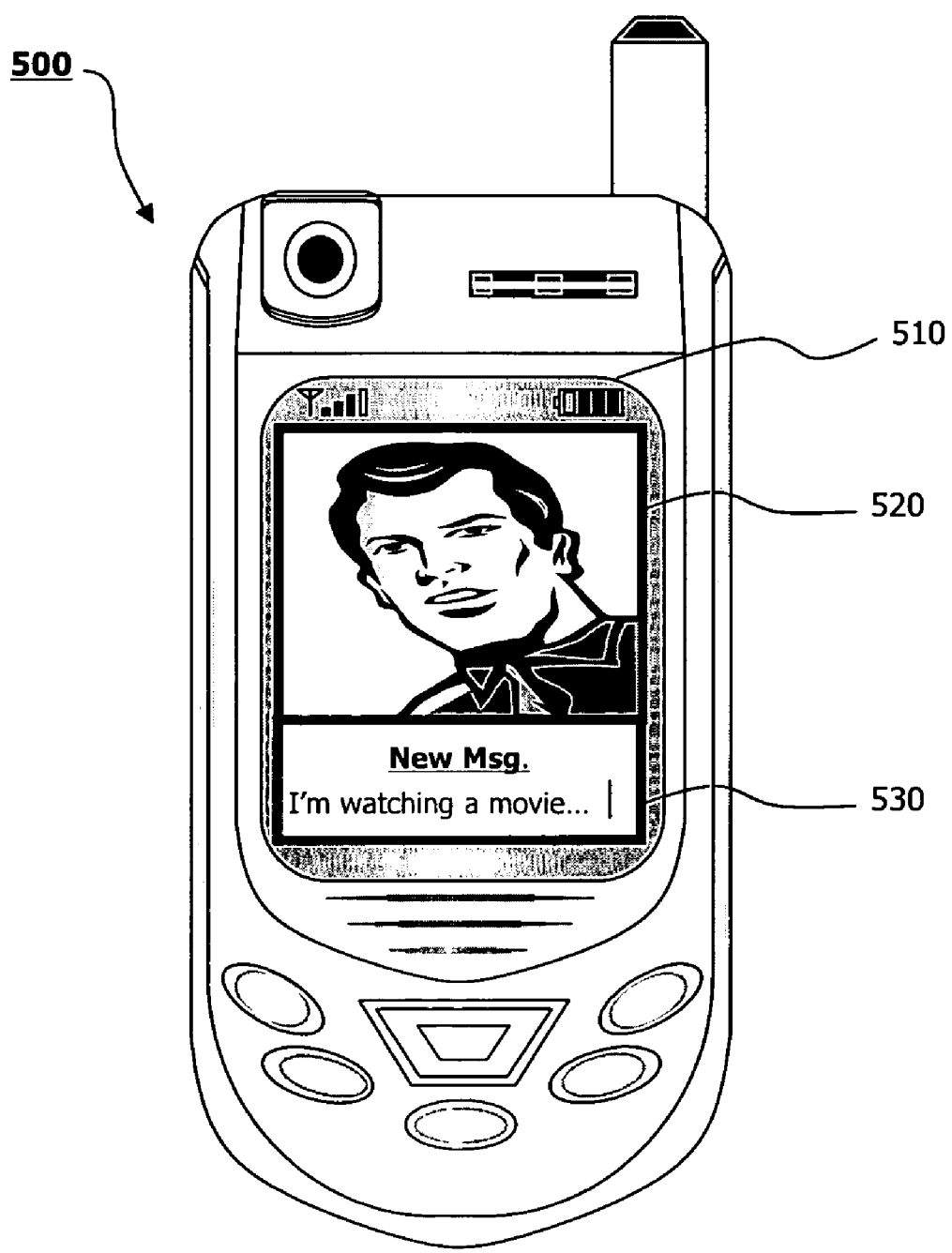
FIG. 5 is an overview showing a mobile terminal including a single display divided into two display portions in accordance with an embodiment of the present invention.

In addition, the priority of each task can be designated based on a predetermined mobile terminal manufacturer standard or may be selectively set by the user. Further, FIG. 1 illustrates the mobile terminal 100 including the first display unit 110 being separate from the second display unit 112. However, as shown in FIG. 5, for example, the mobile terminal 500 may include a single display 510 that is divided into a first display unit 520 and a second display unit 530.

As so far described, the method for managing resources in the mobile terminal according to the present invention prevents unwanted collision of resources which inconveniences the user, and allows the user to perform multiple tasks at the same time.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for managing resources in a mobile terminal, the method comprising:
   determining whether or not a first required resource is available to perform a requested task on the mobile terminal;
   selectively performing the requested task based on whether or not the first required resource is currently being used by another task executing on the terminal;
   checking whether or not there is a second resource that is a substitute resource that can be substituted for the first required resource if the determining step determines the first required resource is currently being used by said another task executing on the terminal;

determining whether or not the first required resource is locked by said another task if the checking step determines there is no substitute resource:

wherein the selectively performing step forcibly terminates the requested task if the determining step determines the first required resource is locked by said another task:

comparing a priority of said another task currently using the first required resource and a priority of the requested task, if the determining step determines the first required resource is not locked by said another task;

terminating said another task and executing the requested task if the comparing step determines said another task has a lower priority than the requested task; and terminating the requested task if the comparing step determines the requested task has a lower priority than said another task.

2. The method of claim 1, further comprising:

determining if the substitute resource is currently being used, wherein the selectively performing step performs the requested task using the substitute resource if the determining step determines the first substitute resource is not currently being used.

3. The method of claim 2, further comprising:

comparing a priority of the requested task with a specific task using the substitute resource if the determining step determines the first substitute resource is being used.

4. The method of claim 3, further comprising:

terminating the specific task and executing the requested task if the comparing step determines the specific task has a lower priority than the requested task; and terminating the requested task and executing the specific task if the comparing step determines the requested task has a lower priority than the specific task.

5. A mobile terminal, comprising:

a display having at least first and second display portions; and a controller configured to determine whether or not a first required resource is available to perform a requested task on at least one of the first and second display portions, and to selectively perform the requested task based on whether or not the first required resource is currently being used by another task executing on the mobile terminal, to check whether or not there is a second resource that is a substitute resource that can be substituted for the first required resource if the first required resource is currently being used by said another task executing on the mobile terminal, to determine whether or not the first required resource is locked by said another task if there is no substitute resource, to terminate the requested task if the first required resource is locked by said another task, to compare a priority of said another task currently using the first required resource and a priority of the requested task, if the first required resource is not locked by said another task, to terminate said another task and to execute the requested task if said another task has a lower priority than the requested task, and to terminate the requested task if the requested task has a lower priority than said another task.

6. The mobile terminal of claim 5, wherein the controller is further configured to determine if the substitute resource is currently being used, and to perform the first requested task using the substitute resource if the substitute resource is not currently being used.

7. The mobile terminal of claim 6, wherein the controller is further configured to compare a priority of the requested task with a specific task using the substitute resource if the first substitute resource is being used.

8. The mobile terminal of claim 7, wherein the controller is further configured to terminate the specific task and to execute the requested task if the specific task has a lower priority than the requested task, and to terminate the requested task and to execute the specific task if the requested task has a lower priority than the specific task.

* * * * *